UNITED STATES PATENT OFFICE.

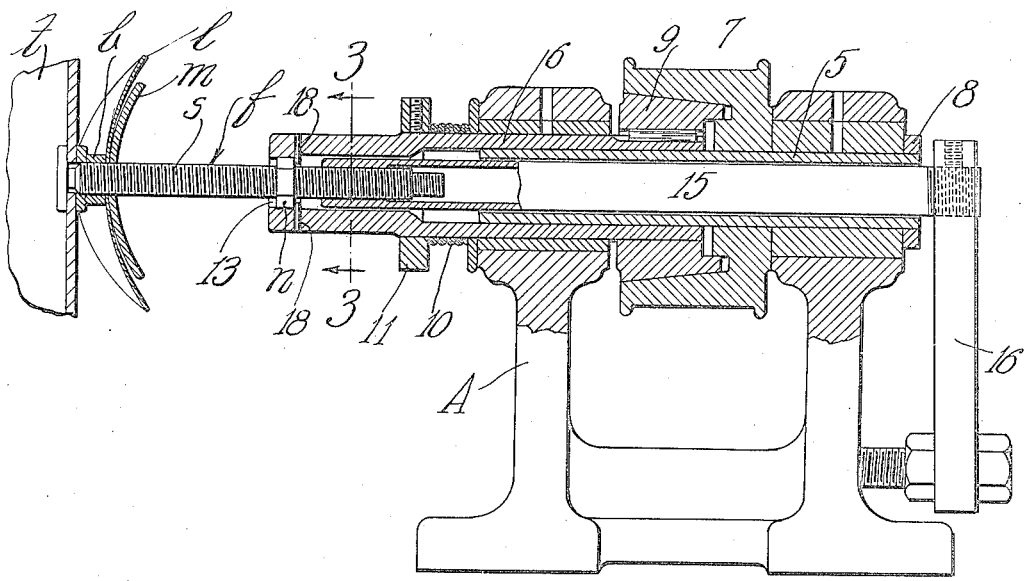

GEORGE H. LEWIS, OF CHICOPEE FALLS, MASSACHUSETTS, ASSIGNOR TO THE FISK RUBBER COMPANY, OF CHICOPEE FALLS, A CORPORATION OF MASSACHUSETTS.

POWER-DRIVEN WRENCH.

1,253,398.   Specification of Letters Patent.   Patented Jan. 15, 1918.

Application filed August 24, 1917. Serial No. 187,949.

*To all whom it may concern:*

Be it known that I, GEORGE H. LEWIS, a citizen of the United States of America, residing at Chicopee Falls, in the county of Hampden and State of Massachusetts, have invented certain new and useful Improvements in Power-Driven Wrenches, of which the following is a specification.

This invention relates to power driven wrenches and more particularly to improvements in such apparatus for the purpose of adapting it to wider fields of use.

While the invention is capable of general application, it finds one advantageous use in applying the nuts to the long threaded portions of the valve stems provided on the inner tubes of pneumatic tires. This operation, when manually performed, is tedious and time-consuming, due to the extraordinary length of thread which is customarily provided on the valve stem. The present invention seeks, among other things, to provide a machine which is capable of efficiently and expeditiously performing the described operation and performing it with that desired degree of uniformity which cannot readily be obtained manually.

An object of the invention is to provide a power driven socket wrench to receive the nut, and a driving arrangement for the wrench, whereby the latter may be automatically rotated by the feeding of the stem to the nut and automatically stopped as the nut is seated with a predetermined pressure, together with means to engage the stem and hold it stationary, characterized in that the stem, which is not readily held manually, may be effectively held automatically during the seating of the nut.

Another object of the invention is to provide a power wrench driven through a friction clutch, one member of which is fastened to the wrench mounted in a suitable bearing and the other member fastened to a drive shaft in a spaced bearing with the friction clutch arranged between the two bearings and the wrench and shaft telescoped to support the clutch from both bearings.

Another object of the invention is to provide, in a machine of the character described, generally simplified and improved mechanical structure.

Other objects and advantages will appear in the following description and will be particularly pointed out in the appended claims.

The invention, in an embodiment at present preferred, is shown for illustrative purposes in the accompanying drawings, in which—

Figure 1 is a sectional elevational view of a power driven wrench embodying the invention;

Fig. 2 is an elevational view of the right hand end of Fig. 1; and

Fig. 3 is a cross sectional view taken on the line 3—3 of Fig. 1.

Referring to these drawings, A represents a pedestal which is formed with two suitable alined and axially spaced bearings. An end of a tubular shaft 5 is journaled in the right hand bearing and extends concentrically within an end of a second tubular shaft 6, which is journaled in the left hand bearing. A pulley 7 is suitably secured to shaft 5 and one end face of the pulley is held against the adjacent face of the right hand bearing by a collar 8, which engages the other face of the bearing. The pulley 7 is thus held against axial movement. The pulley 7 is provided with a frusto conical recess to receive a frusto conical member 9 which is fixed to the shaft 6, as shown in Fig. 1. The member 9 and shaft 6 are free to move axially to the extent permitted by the left hand bearing. A spring 10 coiled about shaft 6 acts between the bearing and a collar 11 fixed on shaft 6 to move the latter until an end face of member 9 is brought into engagement with a face of the left hand bearing. Member 9 and pulley 7, which latter may be suitably driven by belt connections, coöperate to form a friction clutch, the elements of which are normally disengaged by the action of spring 10.

The left hand end of shaft 6 constitutes a socket wrench and has a polygonal recess 13 to receive a nut, such as the hexagonal nut $n$ shown in Fig. 1. Pins 18 in shaft 6 extend inwardly so that their projecting ends form a seat against which the nut $n$ may be axially forced. Within shafts 5 and 6 is a sleeve 15 which extends beyond the right hand end of the shaft 6 and is clamped, as indicated in Fig. 1, to an upright arm 16 secured to the pedestal A. The arm 16 is adapted to support sleeve 15 concentrically within shafts 5 and 6 and to prevent rotation of the sleeve. The interior of the left hand end of sleeve 15 is not truly cylindrical but, as shown in Fig. 3, the cylindrical bore is restricted by two parallel and oppositely arranged flat surfaces 17. The latter are adapted to engage the flats $f$ of the threaded valve stem $s$ of a tire valve or the like and function to prevent rotation of the stem while nut $n$ is being turned thereon by the rotation of shaft 6.

The apparatus is particularly designed for applying the nuts $n$ to the valve stems $s$, which are the customary valve stems provided on the inner tubes of pneumatic tires. In Fig. 1, $t$ represents the inner tube and a head on stem $s$ is held to the latter by a nut $b$. A leather shield $l$ and a metal shield $m$ are slipped over stem $s$ and are to be clamped against nut $b$ by nut $n$.

In operation, the operator first inserts nut $n$ in recess 13, the shaft 6 being at rest since the clutch elements are disengaged. He then inserts stem $s$ in position in the nut and pushes axially thereagainst which, by the engagement of the nut with pins 18, moves shaft 6, compresses spring 10, and forces member 9 into the recess in pulley 7, whereby shaft 6 is rotated. As the nut $n$ is thus turned onto the stem, the latter protrudes through the nut and enters sleeve 15. The stem is turned so that flat faces $f$ aline with surfaces 17 and thereafter the engagement of faces $f$ and surfaces 17 prevent the stem from rotating. The nut $n$ is rapidly turned down on stem $s$, and, when it seats against the shield $m$ with the desired pressure, the pulley 7 slips over member 9 and shaft 6 comes to rest. The operator then ceases to push on shaft 6 and spring 10 automatically disengages the mating clutch elements, whereby shaft 6 comes to rest, and thereafter the stem $s$ may be withdrawn.

An important feature of the invention consists in the means for engaging the flattened faces of stem $s$ and holding the latter against rotation. This is of particular value for the specific use described inasmuch as the operator has nothing which can be readily grasped to give a leverage on the stem to prevent its rotation. The inner tube $t$ is obviously unsuitable for the purpose as are also the shields $l$ and $m$ for these latter elements are loose on stem $s$. At the start of the application of the nut to the stem, no difficulty is encountered in holding the stem for the nut turns readily on the stem, but as the nut progresses on the stem the tendency to turn the latter increases. Particularly the described means are most needed when the nut $n$ seats against shield $m$ for the stem must be held stationary until the clutch elements slip inasmuch as it is desired to seat the nuts with a uniform pressure on the shield and a pressure which may be predetermined by the torque necessary to cause slipping of the clutch elements. In the absence of the means described the operator is forced to use a wrench on nut $b$ to prevent rotation of the stem. The described holding means performs one of the functions heretofore performed manually and lessens the work of the operator and makes for increased speed and increased production.

The invention has been disclosed in an embodiment at present preferred, for the purposes of illustration, but the scope of the invention is defined by the appended claims rather than by the foregoing description.

What I claim is—

1. A power driven wrench, comprising, a hollow and revoluble socket wrench having means to receive a nut to be applied to a threaded stem, a driving member for the wrench normally disconnected from the latter and arranged for automatic connection by the pressure of the stem on the nut to rotate said wrench and apply the nut, and means within said hollow wrench to engage the stem and hold it stationary.

2. A power driven wrench, comprising, a driven shaft, a hollow and revoluble socket wrench adapted to receive a nut to be applied to a threaded stem, mating clutch elements one on the shaft and one on the wrench, means normally holding said elements disengaged, said shaft and wrench being movable axially the one relatively to the other by the manual feeding of the stem to the nut, whereby said elements may be engaged to rotate said wrench and apply the nut to the stem, and means within said hollow wrench to engage the stem and hold it stationary.

3. A power driven wrench to apply nuts to valve stems having one or more flattened surfaces thereon, comprising, a revoluble socket wrench having a recess to hold the nut and a recess to receive the stem as it moves through the nut, a driving member for the wrench normally disconnected from the latter and arranged for automatic connection by the pressure of the stem on the nut, whereby the wrench may be rotated to apply the nut to the stem, and means within said wrench to engage the flattened side of said stem and hold it against rotation.

4. A power driven wrench, comprising, spaced bearing members, a drive shaft supported in one member and extending concentrically within the other member, a tubular socket wrench supported in the other member and telescoped over the end of said drive shaft, a driving pulley on the shaft between said bearings and formed with a clutch element, a clutch element on the socket wrench, and means normally holding said elements disengaged and arranged to permit relative telescopic movement of the shaft and socket wrench to engage said elements.

5. A power driven wrench, comprising, spaced bearing members, a tubular drive shaft supported in one member and extending concentrically within the other member, a tubular socket wrench supported in the other member and telescoped over the end of said drive shaft, a driving pulley on the shaft between said bearings and formed with a clutch element, a clutch element on the socket wrench, means normally holding said elements disengaged and arranged to permit relative telescopic movement of the shaft and socket wrench to engage said elements, and a stationary spindle within said shaft and wrench having a recess to receive the stem as it moves through the nut in the socket wrench, and means to engage the stem and hold it against rotation.

GEORGE H. LEWIS.